United States Patent
He

(10) Patent No.: US 10,769,416 B2
(45) Date of Patent: Sep. 8, 2020

(54) IMAGE PROCESSING METHOD, ELECTRONIC DEVICE AND STORAGE MEDIUM

(71) Applicant: Guangdong OPPO Mobile Telecommunications Corp., Ltd., Dongguan, Guangdong (CN)

(72) Inventor: Xinlan He, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 154 days.

(21) Appl. No.: 16/183,840

(22) Filed: Nov. 8, 2018

(65) Prior Publication Data
US 2019/0286887 A1    Sep. 19, 2019

(30) Foreign Application Priority Data
Mar. 18, 2018    (CN) .......................... 2018 1 0222001

(51) Int. Cl.
*G06K 9/00*   (2006.01)
*G06K 9/40*   (2006.01)
(Continued)

(52) U.S. Cl.
CPC ..... *G06K 9/00288* (2013.01); *G06K 9/00221* (2013.01); *G06K 9/00228* (2013.01); *G06K 9/40* (2013.01); *G06T 5/005* (2013.01); *H04N 5/23219* (2013.01); *H04N 5/23222* (2013.01); *H04N 5/232935* (2018.08); *H04N 5/232939* (2018.08)

(58) Field of Classification Search
CPC ......... G06K 9/00–82; H04N 5/232939; H04N 5/232935; H04N 5/23219; H04N 5/23222; G06T 5/005
See application file for complete search history.

(56) References Cited

U.S. PATENT DOCUMENTS

2007/0201724 A1\* 8/2007 Steinberg ........... H04N 5/23219
382/103
2007/0201725 A1\* 8/2007 Steinberg ........... G06K 9/00308
382/103
(Continued)

FOREIGN PATENT DOCUMENTS

CN    103824068 A    5/2014
CN    103888658 A    6/2014
(Continued)

OTHER PUBLICATIONS

EP Extended Search Report dated Jul. 5, 2019.
(Continued)

*Primary Examiner* — Sean T Motsinger

(57) ABSTRACT

An image processing method, an electronic device, and a storage medium are described. The image processing method may include acquiring a first face information set output by face recognition operation; acquiring recognition duration of the face recognition operation; determining a preview image at a time point earlier than an output time point by the recognition duration, the output time point being a time point when first face information set is output; and binding the first face information set with the determined preview image.

20 Claims, 8 Drawing Sheets

(51) Int. Cl.
   *H04N 5/232* (2006.01)
   *G06T 5/00* (2006.01)

(56) References Cited

U.S. PATENT DOCUMENTS

| | | | | |
|---|---|---|---|---|
| 2008/0316327 | A1* | 12/2008 | Steinberg | G06T 3/4038 348/222.1 |
| 2008/0316328 | A1* | 12/2008 | Steinberg | H04N 5/222 348/222.1 |
| 2008/0317378 | A1* | 12/2008 | Steinberg | H04N 5/2171 382/275 |
| 2010/0097515 | A1* | 4/2010 | Ishii | H04N 5/23212 348/349 |
| 2011/0013038 | A1 | 1/2011 | Kim et al. | |
| 2011/0019936 | A1 | 1/2011 | Bhrugumalla | |
| 2014/0176764 | A1* | 6/2014 | Nakamura | G06K 9/00275 348/231.99 |
| 2017/0155849 | A1* | 6/2017 | Qin | H04N 5/23293 |
| 2018/0032815 | A1* | 2/2018 | Lee | G06K 9/00604 |
| 2019/0080066 | A1* | 3/2019 | Van Os | G06F 21/32 |
| 2019/0286887 | A1* | 9/2019 | He | G06T 5/005 |

FOREIGN PATENT DOCUMENTS

| | | |
|---|---|---|
| CN | 104346159 A | 2/2015 |
| CN | 106372856 A | 2/2017 |
| CN | 106650583 A | 5/2017 |
| CN | 106657759 A | 5/2017 |
| CN | 107124560 A | 5/2017 |
| CN | 108492266 A | 9/2018 |
| KR | 20100073765 | 7/2010 |
| KR | 101240901 B1 | 3/2013 |

OTHER PUBLICATIONS

PCT/CN2019/073328 International Search Report dated Jan. 28, 2019.
English translation of CN OA for CN application No. 201810222001.9 dated Apr. 3, 2020.

* cited by examiner

IMAGE PROCESSING METHOD, ELECTRONIC DEVICE AND STORAGE MEDIUM

CROSS-REFERENCE TO RELATED APPLICATION(S)

The present disclosure claims priority to Chinese Patent Application No. 201810222001.9 filed on Mar. 18, 2018, the content of which is hereby incorporated by reference in its entirety.

TECHNICAL FIELD

The application relates to, but is not limited to, an image processing field, and particularly to an image processing method, an electronic device and a storage medium.

BACKGROUND

Besides a basic image-shooting function, an electronic device may also provide an image processing function, such as beautifying and modifying a face in an image. Face information in an image is recognized before the face in the image is processed. At present, after a camera on an electronic device is started, the electronic device may capture images of external scenes in real time through the camera, and display the captured images as preview images of the external scenes. Meanwhile, the captured images are sent to a face recognition module integrated in the electronic device, for face recognition. When the face recognition module outputs face information, the face information is bound with a preview image at the time point when the face information is output, and used as the face information of the preview image. However, as the face information is not recognized from the preview image, it will adversely affect the accuracy of subsequent image processing of the preview image.

SUMMARY

Implementations of the present disclosure provide an image processing method, an electronic device and a storage medium.

In one aspect, an implementation of the present disclosure provides an image processing method. The method may include: acquiring a first face information set output by face recognition operation; acquiring a recognition duration of the face recognition operation; determining a preview image at a time point earlier than an output time point by the recognition duration, the output time point being a time point when first face information set is output; and binding the first face information set with the determined preview image.

In another aspect, an implementation of the present disclosure provides an electronic device. The electronic device may include a processor and a memory storing a computer program that is executable by the processor to perform steps of: acquiring a first face information set output by face recognition operation; acquiring a recognition duration of the face recognition operation; determining a preview image at a time point earlier than an output time point by the recognition duration, the output time point being a time point when the first face information set is output; and binding the first face information set with the determined preview image.

In yet another aspect, an implementation of the present disclosure provides a non-transitory computer-readable storage medium containing a computer program that is executable by a computer to perform steps of: acquiring a first face information set output by face recognition operation; acquiring a recognition duration of the face recognition operation; determining a preview image at a time point earlier than an output time point by the recognition duration, the output time point being a time point when the first face information set is output; and binding the first face information set with the determined preview image.

A better understanding of the nature and advantages of implementations of the application may be gained with reference to the following detailed description and the accompanying drawings.

BRIEF DESCRIPTION OF THE DRAWINGS

The accompanying drawings are used to provide a further understanding of the technical solutions of the application and form a part of the specification, and together with the implementations of the application, are intended to explain the technical solutions of the application, but do not constitute a limitation on the technical solutions of the application.

DETAILED DESCRIPTION

Figure 1:
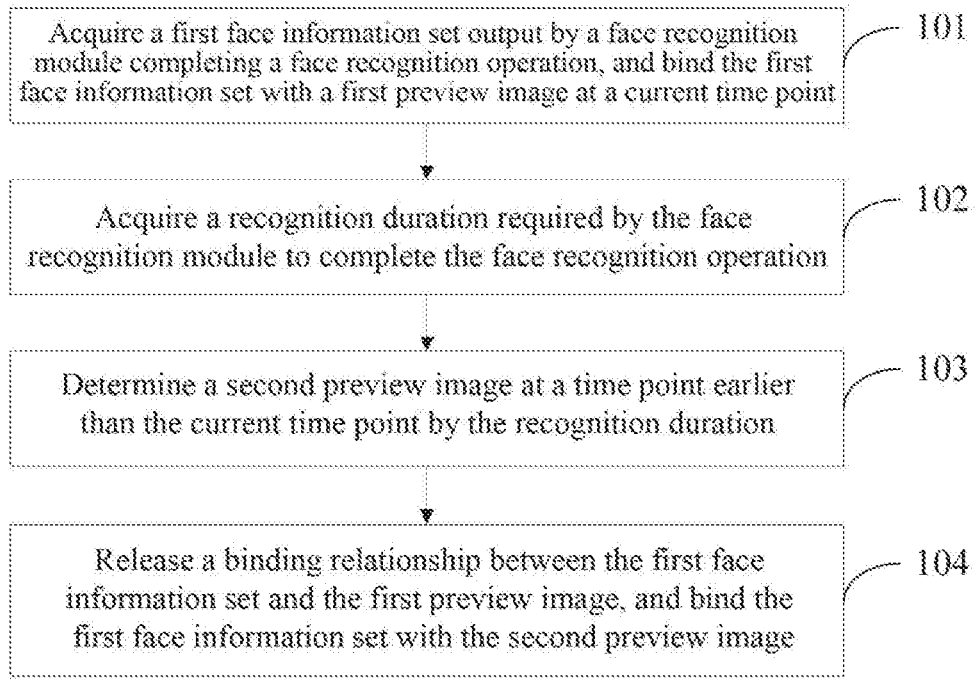
FIG. 1 is a flowchart of an image processing method according to an implementation of the present disclosure.

With reference to the drawings, same component symbols represent same components, and the principles of the present disclosure are illustrated as being implemented in an appropriate computing environment. The following description is based on exemplary implementations of the present disclosure and should not be considered as limiting other implementations not detailed herein.

In the following description, implementations of the present disclosure will be described with reference to steps and operations executed by one or more computers, unless otherwise stated. Therefore, the steps and operations will be mentioned several times as being executed by a computer, which is referred to herein as the computer execution including operations by a computer processing unit that represents electronic signals of data in a structured format. The operation converts the data or maintains it at a location in the computer memory system, which can reconfigure or change the operation of the computer in a manner that is well known to those skilled in the art. The data structure maintained by the data is a physical location of the memory, which has specific characteristics defined by the data format. Although principles are described in the above content, they are not intended to be a restriction. Those skilled in the art will understand that the various steps and operations described below can also be implemented in hardware.

The term "module" used in this disclosure may be deemed as a software object executing on a computing system. The different components, modules, engines, and services described in this disclosure may be deemed as implementation objects on the computing system. The devices and methods described in this disclosure may be implemented in software, and may of course be implemented in hardware, all of which are within the protection scope of the application.

The terms "first", "second" and "third", and the like in the application are used to distinguish different objects and are not used to describe a specific sequence. In addition, the term "include" and "have" and any variations thereof are intended to cover non-exclusive inclusion. For example, a process, method, system, product, or device that includes a series of steps or modules is not limited to the listed steps or modules, but in some implementations may also include steps or modules that are not listed, or in some implementations may also include other steps or modules that are inherent to the process, method, product, or device.

The "implementation" mentioned in this disclosure means that a particular feature, structure, or characteristic described in combination with the implementation may be included in at least one implementation of the present disclosure. The appearance of the word in various places in the specification does not necessarily refer to the same implementation, nor is it an independent or alternative implementation mutually exclusive of other implementations. It is explicitly and implicitly understood by those skilled in the art that implementations described in this disclosure may be combined with other implementations.

An exemplary implementation of the present disclosure provides an image processing method. The image processing method may be performed by an image processing device provided in implementations of the present disclosure or an electronic device integrated with the image processing device, wherein the image processing device may be implemented by hardware or software. The electronic device can be a smart phone, a tablet computer, a palm computer, a notebook computer, or a desktop computer.

With reference to FIG. 1, FIG. 1 is a flowchart of an image processing method according to an exemplary implementation. The flow of the image processing method may include steps 101 to 104.

In step 101, a first face information set output by a face recognition module completing a face recognition operation is acquired, and the first face information set is bound with a first preview image at a current time point.

The face recognition module may be implemented by hardware or software, and implementations of the present disclosure do not restrict the implementation manner of the face recognition module. An electronic device integrated with the face recognition module may perform face recognition on a captured image to acquire a face information set corresponding to the image, wherein face information in the face information set is used for describing face characteristics of a face image in the image, such as one or more of an eyes open degree, eyes open/closed, and a facial expression type and the like.

Implementations of the present disclosure do not restrict a face recognition technology used by the face recognition module to complete the face recognition operation.

In an exemplary implementation, a face recognition module performs a face recognition operation on an input image, and output a first face information set of the input image after completing the face recognition operation, and bind the first face information set with a first preview image at a current time point (i.e., a time point when the first face information set is output). The first face information set is used for describing face characteristics of a face image in the first preview image.

However, the above input image is not the first preview image at the current time point, but a preview image before the current time point.

In step 102, a recognition duration required by the face recognition module to complete the face recognition operation is acquired.

In an exemplary implementation, the recognition duration required by the face recognition module to complete the face recognition operation may be acquired through a test beforehand, and the recognition duration acquired through the test may be stored locally. As such, the recognition duration locally stored may be retrieved when the recognition duration required by the face recognition module to complete the face recognition operation needs to be acquired.

For example, a plurality of test images of the same resolution containing face images may be provided. Then the test images are respectively input into the face recognition module for recognition, and for each test image, a duration from a time point when the test image is input into the face recognition module to a time point when the face recognition module outputs a corresponding face information set is recorded, and used as a recognition duration of the face recognition module for the each test image, thereby a plurality of recognition durations respectively corresponding to the plurality of test images can be acquired. Finally, an average recognition duration of the plurality of recognition durations is calculated, and the calculated average recognition duration is used as the recognition duration required by the face recognition module to complete the face recognition operation.

In another exemplary implementation, the recognition duration required by the face recognition module to complete the face recognition operation may be determined based on an actual duration of a face recognition operation. For example, for an input image currently input into the face recognition module, the actual duration from a time point when the input image is input into the face recognition module to a time point when the face recognition module outputs a corresponding face information set may be recorded, and the actual duration may be used as a recognition duration required by the face recognition module to complete the face recognition operation on the current input image.

In step 103, a second preview image at a time point earlier than the current time point by the recognition duration is determined.

In the implementation of the application, after acquiring the recognition duration required by the face recognition module to complete the face recognition operation, according to the recognition duration, the second preview image at a time point earlier than the current time point by the recognition duration may be determined, that is, the input image corresponding to the first face information set may be determined.

For example, the first face information set output by the face recognition module may be acquired at the current time point t1, and the face recognition module may bind the first face information set with the first preview image at the current time point t1. Then the recognition duration Δt required by the face recognition module to complete the face recognition operation may be acquired. And then a second preview image at a historical time point t2 (t2=t1−Δt) which is earlier than the current time point t1 by the recognition duration Δt may be determined.

In step 104, a binding relationship between the first face information set and the first preview image is released, and the first face information set is bound with the determined second preview image.

Since the first face information set is not acquired by recognizing the first preview image, the binding relationship between the first face information set and the first preview image is released, and the first face information set is bound with the determined second preview image, and used as the face information set of the second preview image to describe face characteristics of a face image in the second preview image.

Figure 2:
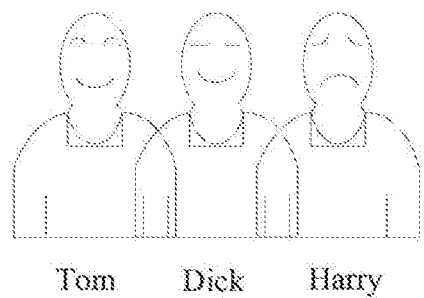
FIG. 2 is a schematic diagram of persons in a scene according to an implementation of the present disclosure.

For example, as shown in FIG. 2, there are three persons, "Tom", "Dick" and "Harry", in a scene. When a camera on an electronic device is started and the camera aims at the scene, the electronic device may capture images of the scene in real time according to a predetermined frame rate through the camera and display the captured images as preview images. At the same time, the electronic device may send the preview images to a face recognition module for face recognition in real time, and the face recognition module may output face information sets recognized by the face recognition module. A face information set may include face information of the three persons Tom, Dick and Harry. For example, a face information set output by the face recognition module may be {Tom, Dick, Harry}, where Tom represents the face information of Tom, Dick represents the face information of Dick, and Harry represents the face information of Harry.

However, in practice, sequences of the face information in the face information sets corresponding to the preview images of the same scene at different time points may be different. For example, a face information set of a preview image at a particular time point is {Tom, Dick, Harry}, while a face information set of a preview image at another time point is {Tom, Harry, Dick}. Image processing may not be performed normally due to the difference in the sequences of the face information. Therefore, a sequence of the face information in a face information set may need to be adjusted.

In an exemplary implementation, the image processing method may further include: acquiring sequence information of face information in a second face information set output by the face recognition module last time; and adjusting a sequence of face information in the first face information set according to the acquired sequence information.

For example, the second face information set output by the face recognition module last time is {Tom, Dick, Harry}, and the first face information set output by the face recognition module this time is {Tom', Harry', Dick' }, wherein Tom and Tom' respectively represent face information of person Tom at different times, Dick and Dick' respectively represent face information of person Dick at different times, and Harry and Harry' respectively represent face information of person Harry at different times. The acquired sequence information of the second face information set is Tom→Dick→Harry. The sequence of the face information in the first face information set may be adjusted according to the acquired sequence information, and the adjusted first face information set is {Tom', Dick', Harry'}.

In an exemplary implementation, the image processing method may further include: adjusting the sequence of the face information in the first face information set according to a predetermined sequence rule for the face information. For example, referring to FIG. 2, a predetermined sequence rule for face information may include: sequencing the face information according to a sequence of the persons from left to right in the image. For example, the first face information set is {Tom, Harry, Dick}, the face information in the first face set is adjusted according to the predetermined sequence rule, and the adjusted first face information set acquired is {Tom, Dick, Harry}.

The operations for adjusting the sequence of the face information in the first face information set may be performed after the first face information set is bound with the second preview image, or may be performed after the first face information set output by the face recognition module is acquired.

In an exemplary implementation, in order to improve the efficiency of face recognition, before acquiring the first face information set output by the face recognition module completing the face recognition operation, the image processing method may further include: acquiring an image of the first category and an image of the second category with the same image content output by an image signal processor, wherein a resolution of the image of the first category is greater than that of the image of the second category; inputting the image of the second category into the face recognition module, and instructing the face recognition module to perform face recognition operation on the image of the second category; and storing the image of the first category as a preview image into a preconfigured image buffer queue.

Figure 11:
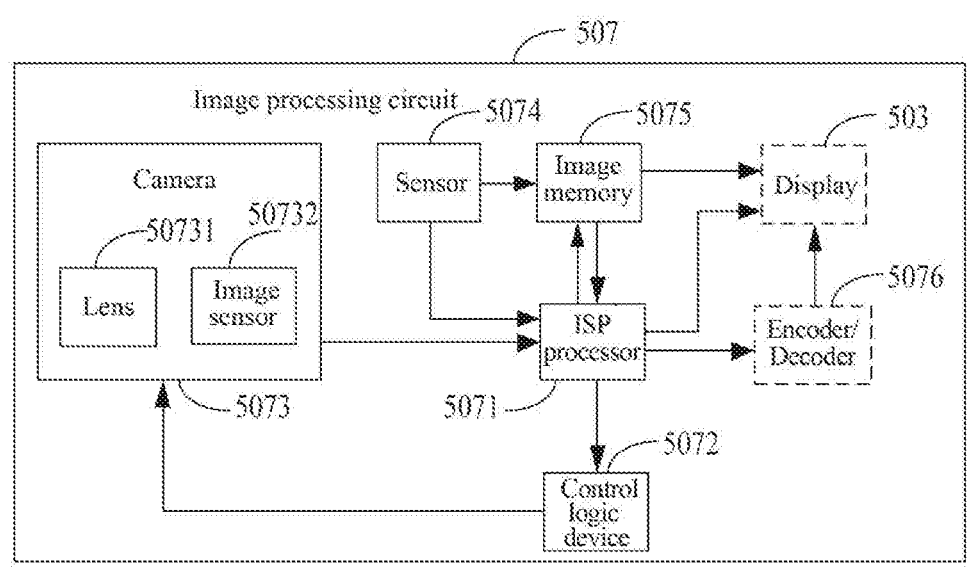
FIG. 11 is a schematic diagram of structure of an image processing circuit according to an implementation of the present disclosure.

Implementations of the present disclosure do not restrict that the image of the first category and the image of the second category with the same image content are output by the image signal processor (for example, the image processing circuit 507 in FIG. 11). In other implementations, for example, the image of the first category and the image of the second category with same image content may be acquired from a memory.

In an exemplary implementation, an original image captured by the camera may be transmitted to the image signal processor for preliminary processing, and the image signal processor may output an image of the first category and an image of the second category having the same content as the original image. The resolution of the image of the first category may be greater than that of the image of the second category. But implementations of the present disclosure do not restrict this. In other implementations, the resolution of the image of the first category may be equal to the resolution of the image of the second category.

In an exemplary implementation, an image of the second category with a smaller resolution is input into a face recognition module for face recognition, so that a face information set of the image of the second category may be acquired more quickly. The image of the first category with a larger resolution is stored as a preview image in a preconfigured image buffer queue, for display and subsequent image processing.

Accordingly, in this disclosure the images of the first category refer to the images stored in the preconfigured image buffer queue, and the images of the second category refer to the images input into the face recognition module for face recognition.

Since the image content of the image of the first category and image of the second category is the same, the face information set recognized from the image of the second category may be used as the face information set of the image of the first category.

In an exemplary implementation, determining a second preview image at a time point earlier than a current time point by the recognition duration may include: determining an image of the first category which is stored in the preconfigured image buffer queue at a time point earlier than the current time point by the recognition duration; and the determined image of the first category being the second preview image.

For example, the first face information set output by the face recognition module may be acquired at a current time point t1, and the first face information set is bound with a preview image at the current time point t1 (i.e., the aforementioned first preview image). Then the recognition duration required by the face recognition module to complete the face recognition operation $\Delta t$ may be acquired. Then an image of the first category which is stored in the preconfigured image buffer queue at time point t2 (t2=t1−$\Delta t$) may be determined, and the determined image of the first category may be used as the aforementioned second preview image. Finally, a binding relationship between the first face information set and the preview image at the current time point t1 may be released, and the first face information set may be bound with the second preview image, that is, the first face information set may be bound with the image of the first category which is stored in the preconfigured image buffer queue at time point t2.

In an exemplary implementation, after binding the first face information set with the second preview image, the image processing method may further include: acquiring frame rate information of a camera when receiving an image shooting request; determining a target number corresponding to the frame rate information, and extracting images of the first category of the target number from the image buffer queue to obtain a set of the image of the first category; determining an image of the first category to be processed from the set of images of the first category according to face information sets bound with the images of the first category in the set of the images of the first category, wherein the image of the first category to be processed comprises at least one face image that meets a predetermined condition; performing predetermined processing on the image of the first category to be processed according to other images of the first category in the set of the images of the first category; and the image of the first category on which the predetermined processing is completed being a result image in response to the image shooting request.

Implementations of the present disclosure do not restrict the way of inputting the image shooting request.

Figure 3:
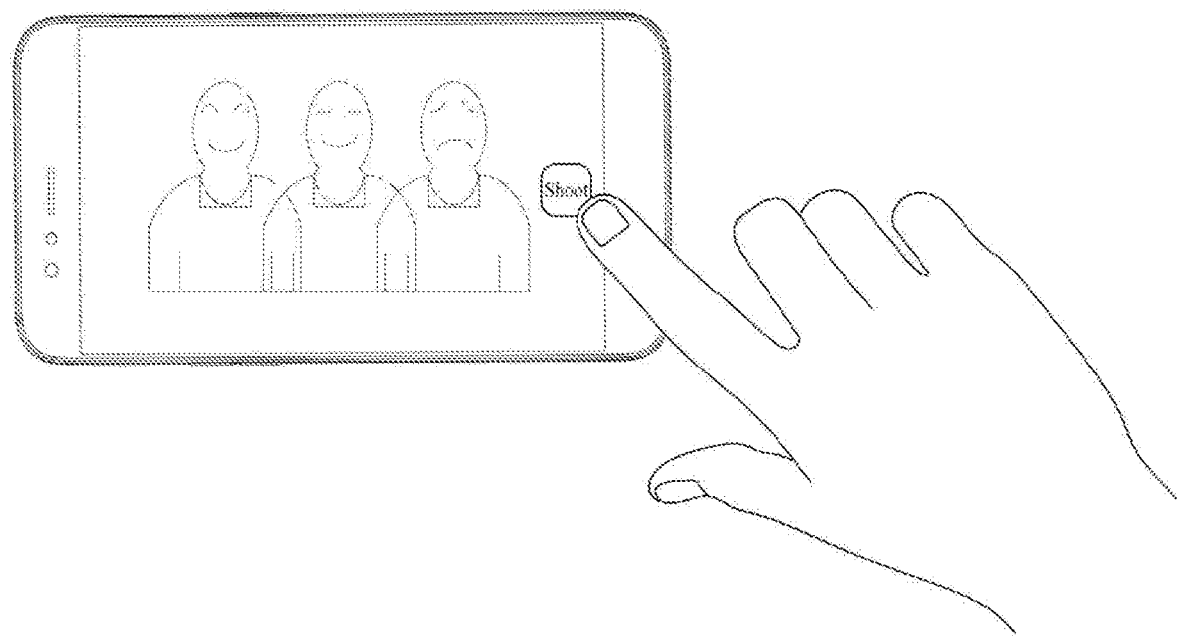
FIG. 3 is a schematic diagram of an operation of triggering an image shooting request according to an implementation of the present disclosure.

For example, with reference to FIG. 3, after a user operates an electronic device to start a photographing application (e.g., a system application "camera" of the electronic device), the user may move the electronic device to let the camera of the electronic device aim at the scene to be shot (the scene to be shot includes a plurality of persons as illustrated in FIG. 3). Then the user may trigger an image shooting request by clicking the "shooting" button (a virtual button) provided by the "camera" application.

For another example, after operating the electronic device to start the photographing application, the user may move the electronic device to let the camera of the electronic device aim at the scene to be shot. Then the user may speak a voice instruction "shoot" to trigger the image shooting request, or directly click a physical shooting key configured on the electronic device to trigger the image shooting request.

In an exemplary implementation, when an image shooting request is received, frame rate information of the camera may be acquired. The frame rate information is used to describe the number of images captured by the camera in a time unit. For example, if the acquired frame rate information is 30 fps (frames per second), it indicates that the camera captures 30 images of the scene to be shot per second, and accordingly, the 30 captured images are sequentially displayed as preview images within one second. For another example, if the acquired frame rate information is 15 fps, it indicates that the camera may capture 15 images of the scene to be shot per second, and accordingly, the 15 captured images are sequentially displayed as preview images within one second.

A main factor that affects the frame rate of a camera is brightness of ambient light. When the brightness of the ambient light is high (that is, the electronic device is in a bright environment), the camera can complete exposure within a short exposure time (e.g., 30 ms), and thus result in a higher frame rate. When the brightness of the ambient light is low (that is, the electronic device is in a dark environment), the camera needs a long exposure time (e.g., 40 ms to 60 ms, or more) to complete the exposure, and thus results in a lower frame rate.

Then, a target number corresponding to the frame rate information may be determined according to the frame rate information of the camera. The target number may have a positive correlation with the frame rate information. For example, if the frame rate information of the camera is 30 fps, the target number determined may be 8, and if the frame rate information of the camera is 15 fps, the target number determined may be 6.

After the target number corresponding to the frame rate information of the camera is determined, images of the first category of the target number may be extracted from the image buffer queue to obtain a set of the images of the first category.

Then, an image of the first category to be processed may be determined from the set of the images of the first category according to face information sets bound with the images of the first category in the set of the images of the first category, wherein the image of the first category to be processed may include at least one face image that meets a predetermined condition.

For example, if the frame rate information of the camera is 30 fps, eight images of the first category may be extracted from the image buffer queue, and the eight images of the first category form a set of the images of the first category. Then, an image of the first category may be determined as the image of the first category to be processed according to face information sets bound with the images of the first category in the set of the images of the first category, and the image of the first category to be processed may include at least one face image that meets a predetermined condition. The predetermined condition may include: an eye open degree of a face image of a person in the image of the first category to be processed is greater than that of a face image of the person in any other images of the first category in the set of images of the first category.

After the image of the first category to be processed is determined, predetermined processing may be performed on the image of the first category to be processed according to other images of the first category in the set of the images of the first category, and the image of the first category on which the predetermined processing is completed may be used as a result image in response to the image shooting request.

In an exemplary implementation, performing predetermined processing on the image of the first category to be processed according to other images of the first category in the set of images of the first category may include: determining a face image to be replaced which does not meet the predetermined condition in the image of the first category to be processed according to the face information set bound with the image of the first category to be processed; determining a target face image which meets the predetermined condition from other images of the first category in the set of images of the first category, the target face image and the face image to be replaced belonging to a same person; and replacing the face image to be replaced with the target face image.

Figure 4:
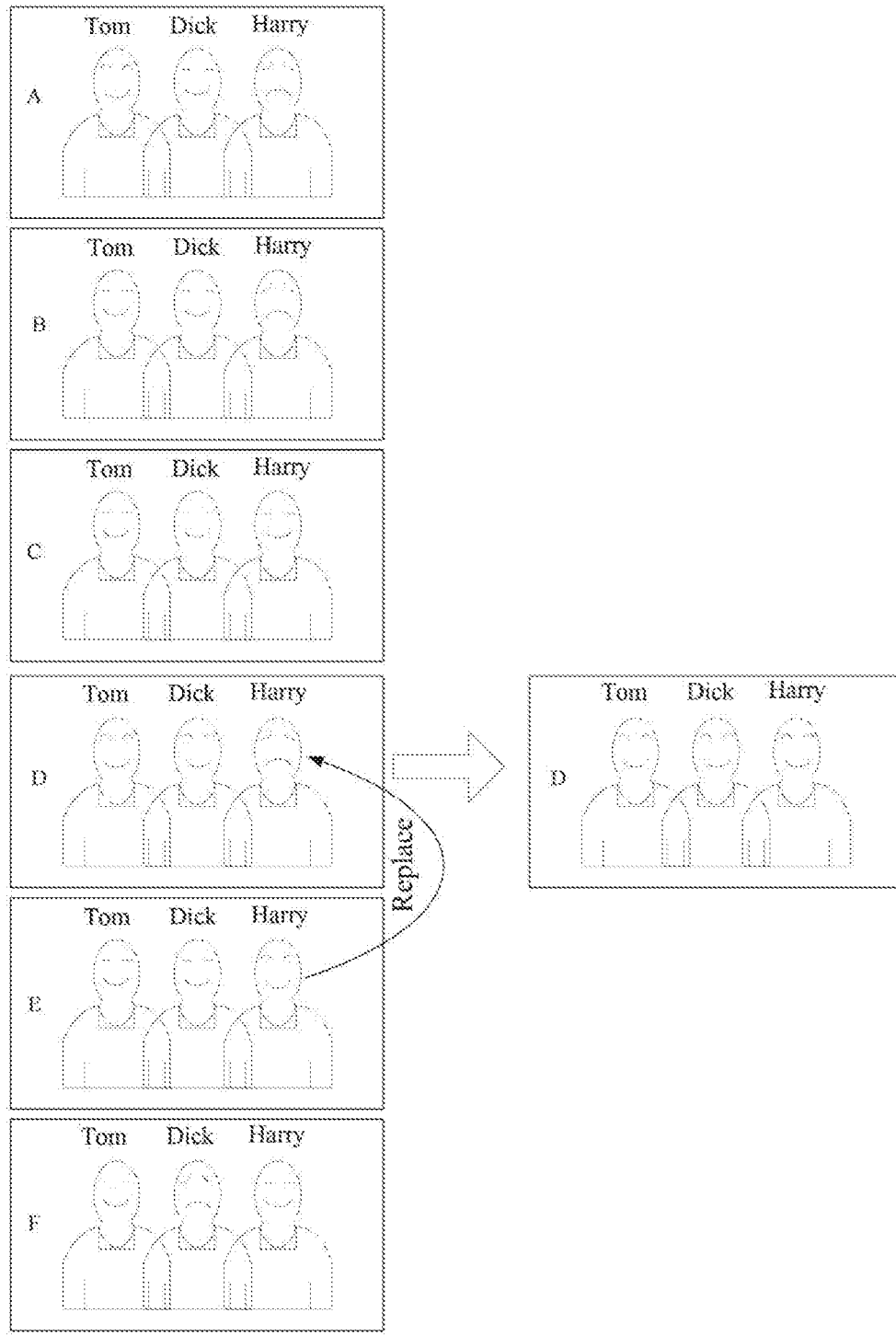
FIG. 4 is a schematic diagram of selecting an image of the first category to be processed and performing predetermined processing on the image of the first category according to an implementation of the present disclosure.

For example, as shown in FIG. 4, an acquired set of the images of the first category includes six images of the first category A, B, C, D, E, F. According to the face information sets bound with the images of the first category, eyes open degrees of the person Tom in the six images of the first category are acquired, which are respectively 85, 70, 71, 86, 72, 73, eyes open degrees of the person Dick in the six images of the first category are acquired, which are respectively 71, 72, 73, 87, 71, 61, and eyes open degrees of the person Harry in these six images of the first category are acquired, which are respectively 60, 62, 72, 64, 84, 73.

For Tom, the face images with the largest eyes open degree are the image A and the image D. For Dick, the face image with the largest eyes open degree is the image D. And for Harry, the face image with the largest eyes open degree is the image E. Since the image D contains the face images with the largest eyes open degree of two persons, the image D may be determined as the image of the first category to be processed.

After the image D is determined as the image of the first category to be processed, the face image of the person Harry in the image D may be determined as a face image to be replaced. Then, the face image of Harry in the image E (in which the eyes open degree is largest) may be determined as a target face image. Then, in the image of the first category to be processed (i.e., the image D), the face image of Harry in the image E (i.e., the target face image) may be used to replace the face image of Harry in the image D, thereby accomplishing the image replacement processing on the image D. As shown in FIG. 4, the eyes open degree of each person in the processed image D is the largest.

In an exemplary implementation, before the image of the first category on which the predetermined processing is completed is used as the result image in response to the image shooting request, the image processing method may further include:

performing noise reduction processing on the image of the first category on which the predetermined processing is completed.

The noise reduction processing may be performed on the image of the first category by using multi-frame noise reduction. For example, referring to FIG. 4, when the image D is determined to be the image of the first category to be processed, the multi-frame noise reduction is performed on the image D after the predetermined processing on the image D is completed, and the multi-frame noise reduction is based on four images of the first category captured in succession including the image D. For example, the multi-frame noise reduction may be performed on the image D based on the image C, the image E, and the image F.

When the multi-frame noise reduction is performed, the image C, the image D, the image E, and the image F may be aligned firstly, and pixel values of each group of aligned pixels may be acquired. If the pixel values of a group of aligned pixels are similar, then an average pixel value of the group of the aligned pixels may be calculated, and the pixel value of the corresponding pixel in the image D may be replaced by the average pixel value. If the pixel values of a group of the aligned pixels are greatly different, the pixel value of the corresponding pixel in the image D may be not adjusted.

For example, pixel P1 in the image C, pixel P2 in the image D, pixel P3 in the image E, and pixel P4 in the image F are a group of mutually aligned pixels, where a pixel value of P1 is 101, a pixel value of P2 is 102, a pixel value of P3 is 103, and a pixel value of P4 is 104, then an average pixel value of the group of mutually aligned pixels is 102.5. Then the pixel value of the pixel P2 in the image D may be adjusted from 102 to 102.5, thereby accomplishing the noise reduction on the pixel P2 in the image D. If a pixel value of P1 is 80, a pixel value of P2 is 102, a pixel value of P3 is 83, and a pixel value of P4 is 90, then pixel values of P1, P2, P3 and P4 are greatly different, and thus the pixel value of P2 may be not adjusted, that is, the pixel value of P2 remains 102 unchanged.

In view of the foregoing, in the exemplary implementations, firstly, the first face information set output by the face recognition module completing the face recognition operation is acquired, and the first face information set is bound with the first preview image at the current time point. Then the recognition duration required by the face recognition module to complete the face recognition operation is acquired, and a second preview image at a time point earlier than the current time point by the recognition duration is determined. Finally, the binding relationship between the first face information set and the first preview image is released, and the first face information set is bound with the second preview image. With the technical solutions provided by the implementations of the application, the face information set bound with the preview image matches with the preview image, and thus can accurately describe the face characteristics of the face image in the preview image, thereby improving the accuracy of image processing.

Figure 5:
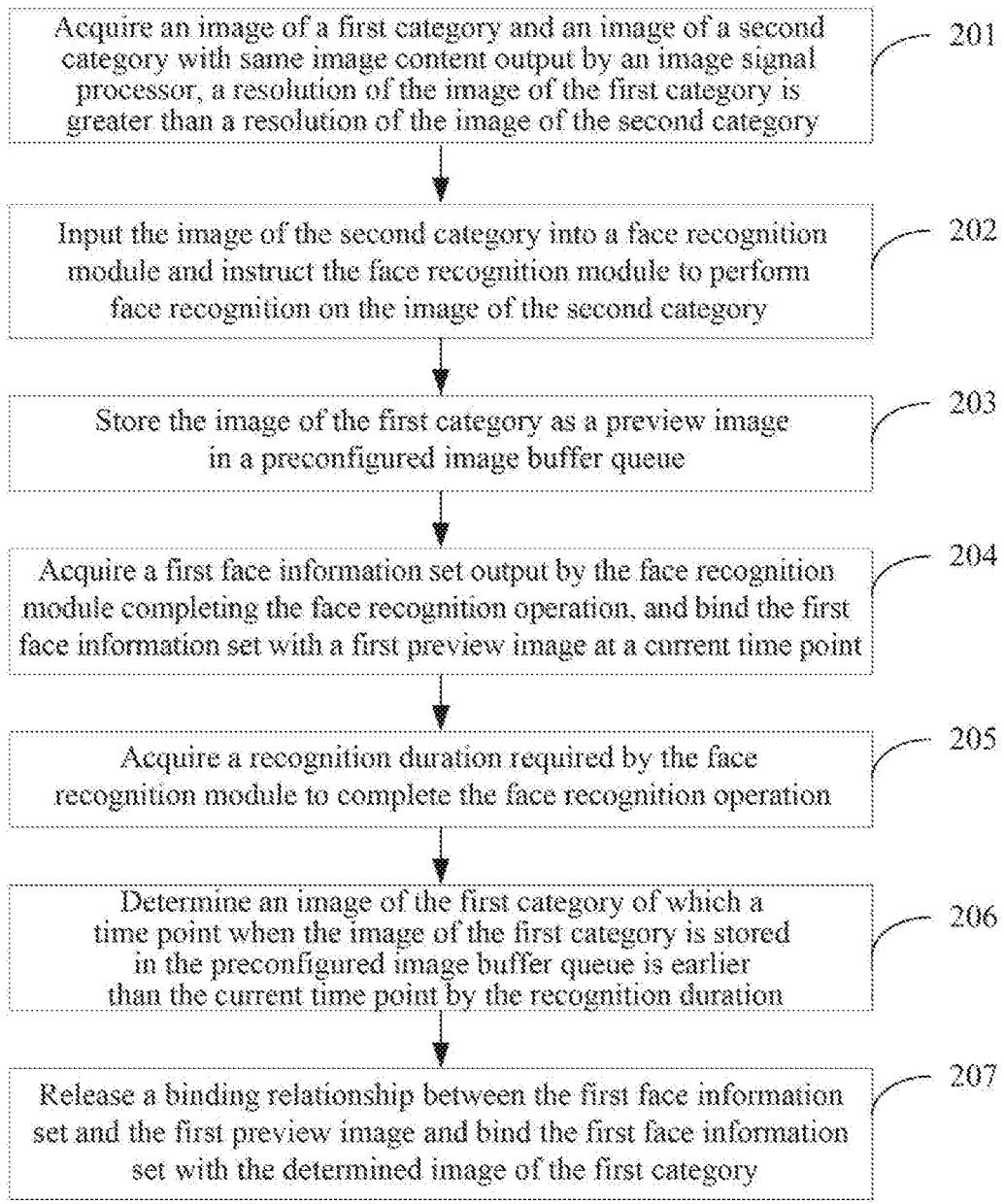
FIG. 5 is another flowchart of an image processing method according to an implementation of the present disclosure.

The image processing method according to implementations of the present disclosure will be further described below on the basis of the methods described in the above implementations. With reference to FIG. 5, the image processing method according to an exemplary implementation may include steps 201 to 207.

In step 201, an image of the first category and an image of the second category with same image content output by an image signal processor are acquired, wherein a resolution of the image of the first category may be greater than that of the image of the second category.

In an exemplary implementation, an original image captured by a camera may be transmitted to an image signal processor for preliminary processing, and the image signal processor may output an image of the first category and an image of the second category having the same content as the original image, wherein a resolution of the image of the first category may be greater than that of the image of the second category.

In step 202, the image of the second category is input into a face recognition module, and the face recognition module is instructed to perform face recognition operation on the image of the second category.

As the image of the second category with a smaller resolution is input into the face recognition module for face recognition, the face information set of the image of the second category can be acquired quickly.

In step 203, the image of the first category is stored as a preview image in a preconfigured image buffer queue.

The image of the first category with a larger resolution may be stored as a preview image in the preconfigured image buffer queue for display and subsequent image processing.

Implementations of the application do not restrict the sequence of steps 202 and 203. For example, steps 202 and 203 may be executed simultaneously.

In step 204, a first face information set output by the face recognition module completing the face recognition operation is acquired, and the first face information set is bound with a first preview image at a current time point.

In implementation, the face recognition module may be implemented in hardware or software, which is not restricted in implementations of the present disclosure. An electronic device integrated with the face recognition module may perform face recognition on a captured image to acquire a face information set corresponding to the image, wherein the face information in the face information set may be used for describing face characteristics of a face image in the image, such as one or more of an eyes open degree, eyes open/closed, a facial expression type and the like.

In addition, implementations of the present disclosure do not restrict a face recognition technology used by the face recognition module.

In an exemplary implementation, the face recognition module may perform a face recognition operation on an input image, and after completing the face recognition operation on the input image, the face recognition module may output a first face information set of the input image, and bind the first face information set with a first preview image at a current time point (i.e., a time point when the first face information set is output). The first face information set may be used for describing face characteristics of a face image in the first preview image.

However, the above input image is not the first preview image at the current time point, but a preview image before the current time point (i.e., a certain image of the first category in the image buffer queue).

In step 205, a recognition duration required by the face recognition module to complete the face recognition operation is acquired.

In an exemplary implementation, the recognition duration required by the face recognition module to complete the face recognition operation may be tested in advance, and the recognition duration acquired by the test may be stored locally. Thus, when the recognition duration required by the face recognition module to complete the face recognition operation is required, the recognition duration locally stored may be retrieved.

For example, a plurality of test images with same resolution containing face images may be provided, then the plurality of test images may be respectively input into the face recognition module for recognition, and for each test image, the duration from a time point when the test image is input into the face recognition module to a time point when the face recognition module outputs a corresponding face information set may be recorded, and used as a recognition duration of the face recognition module for the each test image, thereby a plurality of recognition durations corresponding to the plurality of test images may be acquired. Finally, an average recognition duration of the plurality of recognition durations may be calculated, and the calculated average recognition duration may be used as the recognition duration required by the face recognition module to complete the face recognition operation.

In step 206, an image of the first category of which a time point when the image of the first category is stored in the preconfigured image buffer queue is earlier than the current time point by the recognition duration is determined.

For example, a first face information set output by the face recognition module may be acquired at a current time point t1, and the first face information set is bound with a preview image at the current time point t1 (i.e., the aforementioned first preview image). Then a recognition duration required by the face recognition module to complete the face recognition operation $\Delta t$ may be acquired. And an image of the first category (i.e., the aforementioned second preview image) of which a time point when the image of the first category is stored in the preconfigured image buffer queue is t2 (t2=t1−$\Delta t$) may be determined.

In step 207, a binding relationship between the first face information set and the first preview image is released, and the first face information set is bound with the determined image of the first category.

The first face information set is not recognized from the first preview image. As image content of the image of the first category and the image of the second category is the same, the face information set recognized from the image of the second category may be used as the face information set of the image of the first category. The binding relationship between the first face information set and the first preview image is released, and the first face information set is bound with the determined image of the first category, and used as the face information of the image of the first category to describe face characteristics of a face image in the image of the first category.

Figure 6:
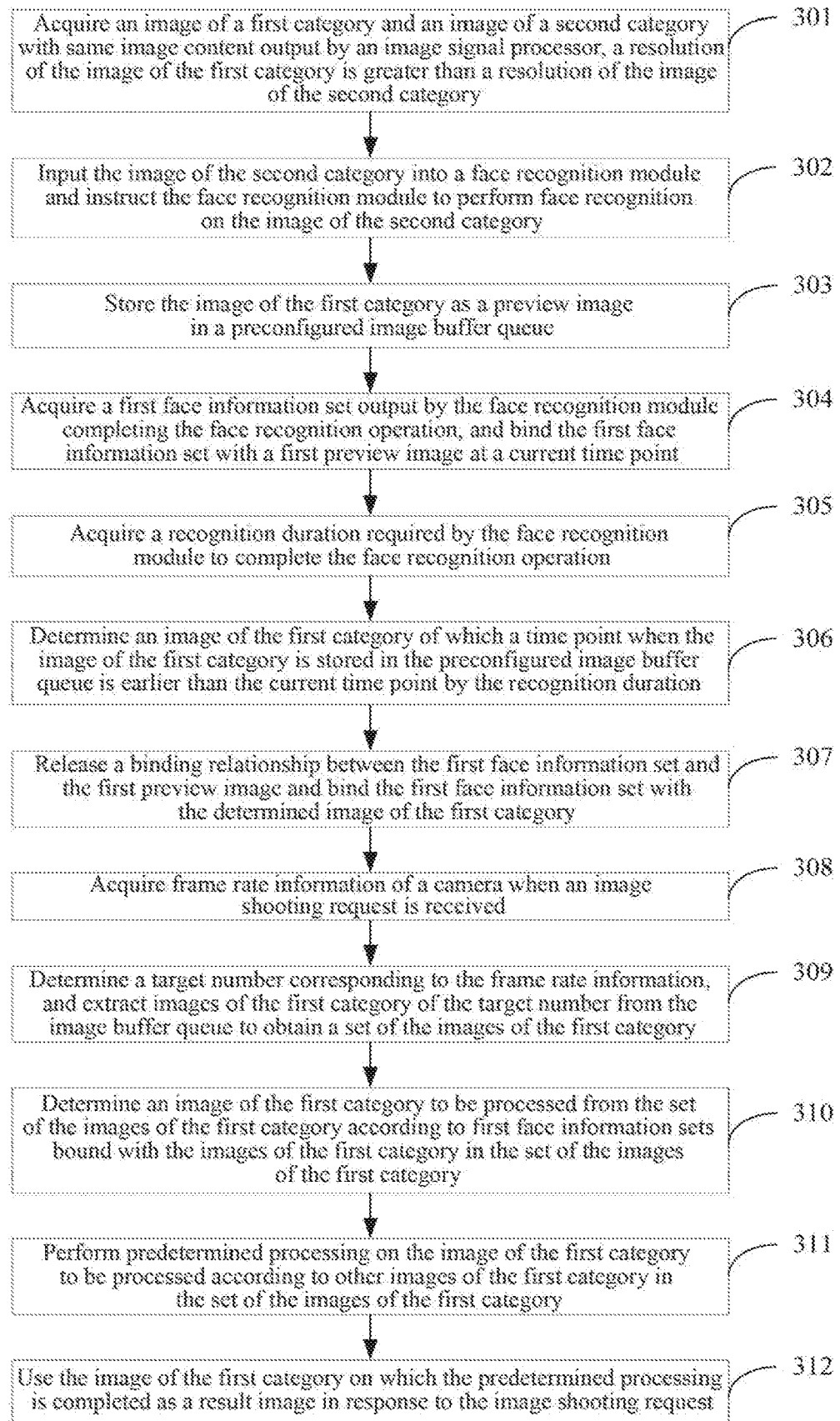
FIG. 6 is yet another flowchart of an image processing method according to an implementation of the present disclosure.

Referring to FIG. 6, the image processing method according to another exemplary implementation of the present disclosure may include steps 301 to 312.

In step 301, an image of the first category and an image of the second category with same image content output by an image signal processor are acquired, wherein a resolution of the image of the first category may be greater than that of the image of the second category.

In an exemplary implementation, an original image captured by a camera may be transmitted to the image signal processor for preliminary processing, and the image signal processor may output an image of the first category and an image of the second category having the same content as the original image, wherein a resolution of the image of the first category may be greater than that of the image of the second category.

In step 302, the image of the second category is input into a face recognition module, and the face recognition module is instructed to perform a face recognition operation on the image of the second category.

As the image of the second category with a smaller resolution is input into the face recognition module for face recognition, the face information set of the image of the second category may be acquired quickly.

In step 303, the image of the first category is stored as a preview image in a preconfigured image buffer queue.

The image of the first category with a larger resolution may be stored as a preview image in the preconfigured image buffer queue for display and subsequent image processing.

Implementations of the present disclosure do not restrict the sequence of steps 302 and 303. For example, steps 302 and 303 may be executed simultaneously.

In step 304, a first face information set output by the face recognition module completing the face recognition operation is acquired, and the first face information set is bound with a first preview image at a current time point.

In implementation, the face recognition module may be implemented by hardware or software, which is not restricted in implementations of the present disclosure. An electronic device integrated with the face recognition module may perform face recognition on a captured image to acquire a face information set corresponding to the image, wherein face information in the face information set may be used for describing face characteristics of a face image in the image, such as one or more of an eyes open degree, eyes open/closed, a facial expression type and the like.

In addition, implementations of the present disclosure do not restrict a face recognition technology used by the face recognition module.

In an exemplary implementation, the face recognition module may perform a face recognition operation on an input image, and after completing the face recognition operation on the input image, the face recognition module may output a first face information set of the input image, and bind the first face information set with a first preview image at a current time point (i.e., a time point when the first face information set is output). The first face information set may be used for describing face characteristics of a face image in the first preview image.

However, the above input image is not the first preview image at the current time point, but a preview image before the current time point (i.e., a certain image of the first category in the image buffer queue).

In step 305, a recognition duration required by the face recognition module to complete the face recognition operation is acquired.

In an exemplary implementation, the recognition duration required by the face recognition module to complete the face recognition operation may be tested in advance, and the recognition duration acquired by the test may be stored locally. Thus, when the recognition duration required by the face recognition module to complete the face recognition operation is required, the recognition duration locally stored may be retrieved.

For example, a plurality of test images with same resolution containing face images may be provided, then the plurality of test images may be respectively input into the face recognition module for recognition, and for each test image, the duration from a time point when the test image is input into the face recognition module to a time point when the face recognition module outputs the corresponding face information set may be recorded, and used as a recognition duration of the face recognition module for the each test image, thereby a plurality of recognition durations corresponding to the plurality of the test images may be acquired. Finally, an average recognition duration of the plurality of recognition durations may be calculated, and the calculated average recognition duration may be used as the recognition duration required by the face recognition module to complete the face recognition operation.

In step 306, an image of the first category of which a time point when the image of the first category is stored in the preconfigured image buffer queue is earlier than the current time point by the recognition duration is determined.

For example, a first face information set output by the face recognition module may be acquired at a current time point t1, and the first face information set may be bound with a preview image at the current time point t1 (i.e., the aforementioned first preview image). Then a recognition duration $\Delta t$ required by the face recognition module to complete the face recognition operation may be acquired. And an image of the first category (i.e., the aforementioned second preview image) of which a time point when the image of the first category is stored in the preconfigured image buffer queue is t2 ($t2=t1-\Delta t$) may be determined.

In step 307, a binding relationship between the first face information set and the first preview image is released, and the first face information set is bound with the determined image of the first category.

The first face information set is not recognized from the first preview image. As the image content of the image of the first category and the image of the second category is the same, the face information set recognized from the image of the second category can be used as the face information set of the image of the first category. The binding relationship between the first face information set and the first preview image is released, and the first face information set is bound with the determined image of the first category, and used as the face information of the image of the first category to describe face characteristics of a face image in the image of the first category.

In step 308, when an image shooting request is received, frame rate information of the camera is acquired.

Implementations of the present disclosure do not restrict the way of inputting the image shooting request.

For example, with reference to FIG. 3, after operating an electronic device to start a photographing application (e.g., a system application "camera" of the electronic device), a user may move the electronic device to let the camera of the electronic device aim at the scene to be shot (the scene to be shot includes a plurality of persons as illustrated in FIG. 3), then the user may trigger an image shooting request by clicking the "shooting" button (a virtual button) provided by the "camera" application.

For another example, after operating the electronic device to start the photographing application, the user may move the electronic device to let the camera of the electronic device aim at the scene to be shot, then the user may speak a voice instruction "shoot" to trigger the image shooting request or directly click a physical shooting key configured on the electronic device to trigger the image shooting request.

In an implementation of the application, when an image shooting request is received, frame rate information of the camera may be acquired. The frame rate information may be used to describe the number of images captured by the camera in a time unit. For example, if the acquired frame rate information is 30 fps (frames per second), it indicates that the camera may capture 30 images of the scene to be shot per second, and accordingly, the 30 captured images may be sequentially displayed as preview images within one second. For another example, if the acquired frame rate information is 15 fps, it indicates that the camera may capture 15 images of the scene to be shot per second, and accordingly, the 15 captured images may be sequentially displayed as preview images within one second.

A main factor that affects the frame rate of a camera is brightness of ambient light. When the brightness of the ambient light is high (that is, the electronic device is in a bright environment), the camera can complete exposure within a short exposure time (e.g., 30 ms), and thus result in a higher frame rate. When the brightness of the ambient light is low (that is, the electronic device is in a dark environment), the camera needs a long exposure time (e.g., 40 ms to 60 ms, or more) to complete the exposure, and thus results in a lower frame rate.

In step 309, a target number corresponding to the frame rate information is determined, and the images of the first category of the target number are extracted from the image buffer queue to obtain a set of the images of the first category.

The target number may have a positive correlation with the frame rate information. For example, if the frame rate information of the camera is 30 fps, the target number determined may be 8, and if the frame rate information of the camera is 15 fps, the target number determined may be 6.

After the target number corresponding to the frame rate information of the camera is determined, the images of the first category of the target number may be extracted from the image buffer queue to form a set of the images of the first category.

In step 310, an image of the first category to be processed is determined from the set of the images of the first category according to face information sets bound with the images of the first category in the set of the images of the first category, wherein the image of the first category to be processed may contain at least one face image which meets a predetermined condition.

For example, if the frame rate information of the camera is 30 fps, eight images of the first category may be extracted from the image buffer queue, and the eight images of the first category may form a set of the images of the first category. Then, an image of the first category may be determined as the image of the first category to be processed according to the face information sets bound with the images of the first category in the set of the images of the first category, and the image of the first category to be processed may contain at least one face image which meets a predetermined condition. The predetermined condition may include: an eye open degree of a face image of a person in the image of the first category to be processed is greater than that of a face image of the person in any other first face image in the set of the images of the first category.

In step 311, predetermined processing is performed on the image of the first category to be processed according to other images of the first category in the set of the images of the first category.

In an exemplary implementation, performing predetermined processing on the image of the first category to be processed according to other images of the first category in the set of the images of the first category may include: determining a face image to be replaced which does not meet the predetermined condition in the image of the first category to be processed according to the face information set bound with the image of the first category to be processed; determining a target face image which meets the predetermined condition from other images of the first category in the set of images of the first category, the target face image and the face image to be replaced belonging to a same person; and replacing the face image to be replaced with the target face image.

For example, with reference to FIG. 4, the acquired set of the images of the first category includes six images of the first category A, B, C, D, E, F. According to the face information sets bound with the images of the first category, eyes open degrees of the person Tom in the six images of the first category are acquired, which are respectively 85, 70, 71, 86, 72, 73, eyes open degrees of the person Dick in the six images of the first category are acquired, which are respectively 71, 72, 73, 87, 71, 61, and eyes open degrees of the person Harry in these six images of the first category are acquired, which are respectively 60, 62, 72, 64, 84 and 73.

For Tom, the face images with the largest eyes open degree are the image A and the image D. For Dick, the face image with the largest eyes open degree is the image D. And for Harry, the face image with the largest eyes open degree is the image E. Since the image D contains the face images with the largest eyes open degree of two persons, the image D may be determined as the image of the first category to be processed.

After the image D is determined as the image of the first category to be processed, the face image of the person Harry in the image D may be determined as a face image to be replaced. Then, the face image of Harry in the image E (in which the eyes open degree of Harry is largest) is determined as a target face image. Then, in the image of the first category to be processed (i.e., the image D), the face image of Harry in the image E (i.e., the target face image) may be used to replace the face image of Harry in the image D, thereby accomplishing image replacement processing on the image D. As shown in FIG. 4, the eyes open degree of each person in the processed image D is the largest.

In step 312, the image of the first category on which the predetermined processing is completed is used as a result image in response to the image shooting request.

After the predetermined processing performed on the image of the first category to be processed is completed, the image of the first category on which the predetermined processing is completed may be used as the result image of the image shooting request and output.

Figure 7:
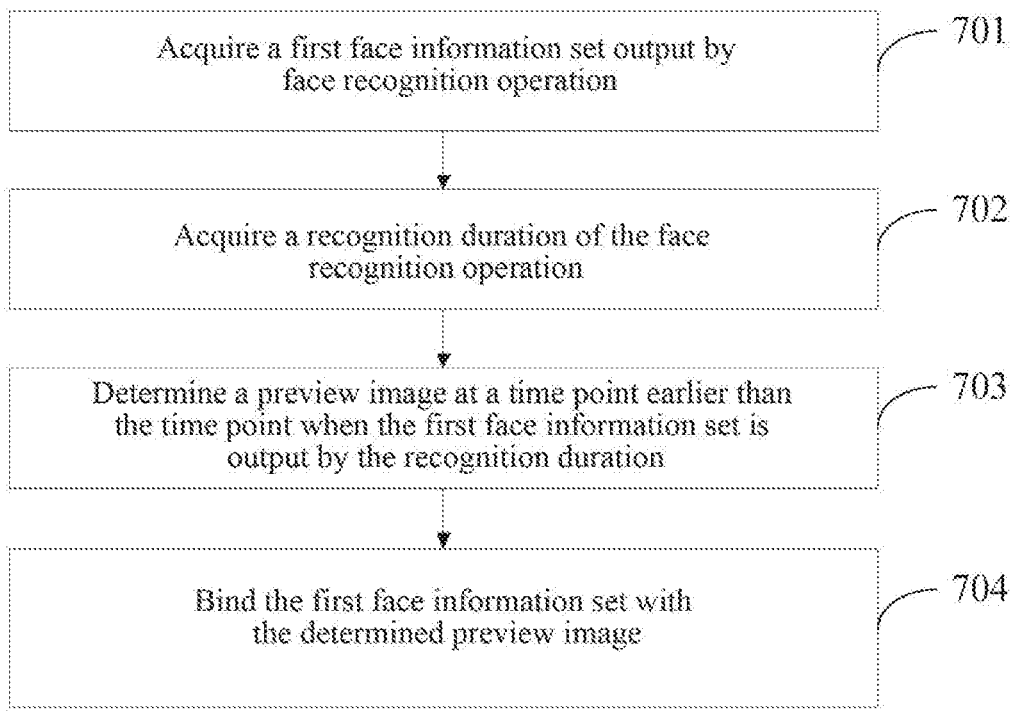
FIG. 7 is yet another flowchart of an image processing method according to an implementation of the present disclosure.

With reference to FIG. 7, it is a flowchart of the image processing method according to yet another exemplary implementation of the application. The image processing method may include steps 701 to 704.

In step 701, a first face information set output by face recognition operation is acquired.

In an exemplary implementation, a first face information set output by a face recognition module completing the face recognition operation may be acquired. Relevant description about the face recognition module completing the face recognition operation may be found in the implementations described before, and will not be repeated here. However, the present disclosure does not restrict that the face recognition operation is completed by a face recognition module. In other implementations, an electronic device having a face recognition function may be used to perform the face recognition operation on a captured image to acquire a face information set corresponding to the image. The face information in the face information set may be used to describe face characteristics of a face image in the image, such as one or more of an eye open degree, eyes open/closed, a facial expression type, etc.

In step 702, a recognition duration of the face recognition operation is acquired.

In an exemplary implementation, acquiring the recognition duration of the face recognition operation may include acquiring a recognition duration required by a face recognition module to complete the face recognition operation.

In an exemplary implementation, the recognition duration of the face recognition operation may be tested in advance and the recognition duration acquired by the test may be stored locally. When the recognition duration is required, the locally stored recognition duration may be retrieved.

In another exemplary implementation, the recognition duration of the face recognition operation may be recorded in real time.

In step 703, a preview image at a time point earlier than the time point when the first face information set is output by the recognition duration is determined.

It should be noted that, the time point when the first face information set is output is mentioned as the current time point in implementations described before, the preview image at the time point when the first face information set is output is mentioned as the first preview image in the implementations described before, and the preview image at the time point earlier than the time point when the first face information set is output by the recognition duration is mentioned as the second preview image in the implementations described before.

For example, the first face information set is acquired at the current time point t1, and the recognition duration Δt required by the face recognition operation is acquired, and then the preview image at time point t2 (t2=t1−Δt) which is earlier than the current time point t1 by the recognition duration is determined.

In step 704, the first face information set is bound with the determined preview image.

The first face information set is bound with the determined preview image (i.e., the second preview image as mentioned in implementations described before), and used as a face information set of the determined preview image to describe face characteristics of a face image in the determined preview image. The face information set bound with the preview image matches with the preview image.

In an exemplary implementation, after acquiring the first face information set output by the face recognition operation, the image processing method may further include: binding the first face information set with a preview image at a time point when the first face information set is output.

Before binding the first face information set with the determined preview image, the image processing method may further include: releasing the binding relationship between the first face information set and the preview image at the time point when the first face information set is output.

In an exemplary implementation, after binding the first face information set with the determined preview image, the image processing method may further include: acquiring sequence information of face information in a second face information set output by the face recognition operation last time; and adjusting a sequence of face information in the first face information set according to the acquired sequence information.

For example, the second face information set output by the face recognition operation last time is {Tom, Dick, Harry}, and the first face information set output by the face recognition operation this time is {Tom', Harry', Dick'}, wherein Tom and Tom' respectively represent face information of the person Tom at different time points, Dick and Dick' respectively represent face information of the person Dick at different time points, and Harry and Harry' respectively represent face information of the person Harry at different time points. The acquired sequence information of the second face information set is Tom→Dick→Harry. The sequence of the face information in the first face information set may be adjusted according to the acquired sequence information, and the adjusted first face information set is {Tom', Dick', Harry'}.

In an exemplary implementation, after acquiring the first face information set output by the face recognition operation, the image processing method may further include: acquiring sequence information of face information in a second face information set output by the face recognition operation last time; and adjusting a sequence of the face information in the first face information set according to the acquired sequence information. In this exemplary implementation, the sequence of the face information in the first face information set may be adjusted immediately after the first face information set is acquired, thereby the first face information set can be processed timely.

In an exemplary implementation, after acquiring the first face information set output by the face recognition module completing the face recognition operation, the image processing method may further include:

adjusting a sequence of the face information in the first face information set according to a predetermined sequence rule for face information.

For example, referring to FIG. 2, the predetermined sequence rule for face information may include: sequencing the face information according to a sequence of the persons from left to right in the image. For example, the first face information set is {Tom, Harry, Dick}, the face information in the first face set is adjusted according to the predetermined rule for face information, and the adjusted first face information set may be acquired as {Tom, Dick, Harry}.

In an exemplary implementation, before acquiring the first face information set output by the face recognition operation, the image processing method may further include: acquiring an image of the first category and an image of the second category having same image content; wherein the face recognition operation is performed on the image of the second category; and the image of the first category is stored as a preview image into a preconfigured image buffer queue. Since the image content of the image of the first category and the image of the second category is the same, the face information set recognized from the image of the second category may be used as a face information set of the image of the first category.

In an exemplary implementation, an image of the first category and an image of the second category with same image content output by an image signal processor may be acquired. However, the present disclosure does not restrict the way of acquiring the image of the first category and image of the second category. In other implementations, the image of the first category and image of the second category with the same image content may be acquired from a memory.

In an exemplary implementation, a resolution of the image of the first category may be greater than a resolution of the image of the second category. The face recognition operation is performed on the image of the second category with a smaller resolution, so that the face information set of the image of the second category may be acquired quickly. The image of the first category with a larger resolution is stored as a preview image in a preconfigured image buffer queue for display and subsequent image processing. However, the application is not limited to this manner. In other implementations, the resolution of the image of the first category may be equal to the resolution of the image of the second category.

In an exemplary implementation, determining the preview image at a time point earlier than the time point when the first face information set is output by the recognition duration may include: determining an image of the first category of which a time point when the image of the first category is stored in the preconfigured image buffer queue is earlier that the time point when the first face information set is output by the recognition duration; and the determined image of the first category being the determined preview image.

In an exemplary implementation, after binding the first face information set with the determine preview image, the image processing method may further include: acquiring frame rate information of the camera when an image shooting request is received; determining a target number corresponding to the frame rate information, and extracting images of the first category of the target number from the image buffer queue to obtain a set of images of the first category; determining an image of the first category to be processed from the set of images of the first category according to the face information sets bound with the images of the first category in the set of images of the first category, wherein the image of the first category to be processed includes at least one face image which meets a predetermined condition; performing predetermined processing on the image of the first category to be processed according to other images of the first category in the set of images of the first category; and the image of the first category on which the predetermined processing is completed being a result image in response to the image shooting request.

For example, the predetermined condition may include: an eye open degree of a face image of a person in the image of the first category to be processed is greater than that of a face image of the person in any other image of the first category in the set of images of the first category-.

In an exemplary implementation, performing predetermined processing on the image of the first category to be processed according to other images of the first category in the set of images of the first category may include: determining a face image to be replaced which does not meet the predetermined condition in the image of the first category to be processed according to the face information set bound with the image of the first category to be processed; determining a target face image which meets the predetermined condition from other images of the first category in the set of images of the first category, the target face image and the face image to be replaced belonging to a same person; and replacing the face image to be replaced with the target face image.

In an exemplary implementation, before the image of the first category on which the predetermined processing is completed is used as a result image in response to the image shooting request, the image processing method may further include: performing noise reduction on the image of the first category on which the predetermined processing is completed.

In an exemplary implementation, performing the noise reduction on the image of the first category on which the predetermined processing is completed may include: performing noise reduction on the image of the first category by applying multi-frame noise reduction.

As can be seen from the above implementation, firstly, a first face information set output by face recognition operation is acquired, and the recognition duration of the face recognition operation is acquired, then a preview image at a time point earlier than the time point when the first face information set is output by the recognition duration is determined, and finally, the first face information set is bound with the determined preview image. With the technical solution provided by the implementation of the application, the face information set bound with the preview image matches with the preview image, and thus can accurately describe the face characteristics of a face image in the preview image, thereby improving the accuracy of image processing. Other features of the implementation may be similar as those of the implementations described before.

Figure 8:
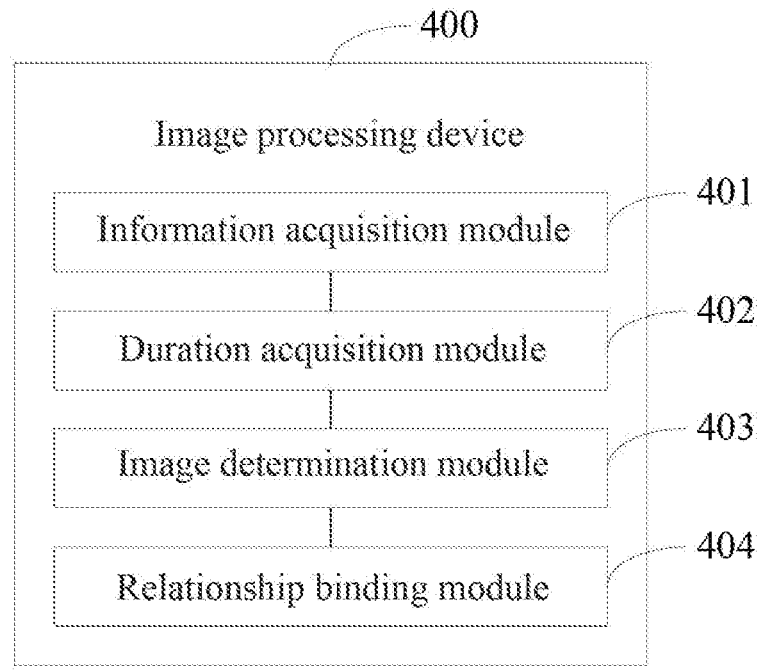
FIG. 8 is a schematic diagram of structure of an image processing device according to an implementation of the present disclosure.

In an implementation, an image processing device is provided. With reference to FIG. 8, it is a schematic structural diagram of an image processing device 400 according to the implementation of the present disclosure. The image processing device 400 may be applied in an electronic device. The image processing device 400 may include an information acquisition module 401, a duration acquisition module 402, an image determination module 403, and a relationship binding module 404.

The information acquisition module 401 may be configured to acquire a first face information set output by face recognition operation.

The duration acquisition module 402 may be configured to acquire a recognition duration of the face recognition operation.

The image determination module 403 may be configured to determine a preview image at a time point earlier than the time point when the first face information set is output by the recognition duration.

The relationship binding module 404 may be configured to bind the first face information with the determined preview image.

In an exemplary implementation, the information acquisition module 401 may be configured to acquire the first face information output by a face recognition module completing the face recognition operation; and the duration acquisition module 402 may be configured to acquire the recognition duration required by the face recognition module to complete the face recognition operation.

In an exemplary implementation, the relationship binding module 404 may also be configured to bind the first face information set with the preview image at the time point when the first face information set is output after the information acquisition module 401 acquires the first face information set; and before binding the first face information set with the determined preview image, release the binding relationship between the first face information set and the preview image at the time point when the first face information set is output.

It should be noted that, the preview image at the time point when the first face information set is output is mentioned as the first preview image in the implementations described before, and the preview image at the time point earlier than the time point when the first face information set is output by the recognition duration is mentioned as the second preview image in the implementations described before.

In an exemplary implementation, the image processing device 400 may further include a sequence adjustment module. The sequence adjustment module may be configured to acquire sequence information of face information in a second face information set output by the face recognition operation last time; and adjust the sequence of face information in the first face information set according to the acquired sequence information.

In an exemplary implementation, the image processing device 400 may further include an image acquisition module. The image acquisition module may be configured to acquire an image of the first category and an image of the second category with same image content output by an image signal processor, wherein a resolution of the image of the first category is greater than that of the image of the second category; input the image of the second category into the face recognition module, and instruct the face recognition module to perform a face recognition operation on the image of the second category; and store the image of the first category as a preview image into a preconfigured image buffer queue.

In an exemplary implementation, the duration acquisition module 402 may be configured to: determine an image of the first category of which a time point when the image of the first category is stored in the preconfigured image buffer queue is earlier than the time point when the first face information set is output by the recognition duration; and use the determined image of the first category as the determined preview image.

In an exemplary implementation, the image processing device 400 may further include an image processing module. The image processing module may be configured to, when an image shooting request is received, acquire frame rate information of a camera; determine a target number corresponding to the acquired frame rate information, and extract images of the first category of the target number from the image buffer queue to obtain a set of the images of the first category; determine an image of the first category to be processed from the set of the images of the first category according to face information sets bound with the images of the first category in the set of the images of the first category, wherein the image of the first category to be processed includes at least one face image which meets a predetermined condition; perform predetermined processing on the image of the first category to be processed according to other images of the first category in the set of the images of the first category; and use the image of the first category on which the predetermined processing is completed as a result image in response to the image shooting request.

In an exemplary implementation, the image processing module may be configured to perform predetermined processing on the image of the first category to be processed according to other images of the first category in the set of the images of the first category in a following way: determining a face image to be replaced which does not meet the predetermined condition in the image of the first category to be processed according to the face information set bound with the image of the first category to be processed; determining a target face image which meets the predetermined condition from other images of the first category in the set of images of the first category, the target face image and the face image to be replaced belonging to a same person; and replacing the face image to be replaced with the target face image.

In implementation, the various modules above may be implemented as an independent entity, or may be arbitrarily combined as one entity or several entities. The implementations described before may be referred to for the specific implementation of the various modules, which will not be repeated here.

It can be seen from the above implementation that, the image processing device 400 may firstly acquire a first face information set output by face recognition operation by using the information acquisition module 401, and acquire the recognition duration of the face recognition operation by using the duration acquisition module 402, then determine the preview image at the time point earlier than the time point when the first face information set is output by the recognition duration by using the image determination module 403; and then bind the first face information set with the determined preview image by using the relationship binding module 404. With the image processing device provided by the implementation application, the face information set bound with the preview image matches with the preview image, and thus can accurately describe the face characteristics of a face image in the preview image, thereby improving the accuracy of image processing.

Figure 9:
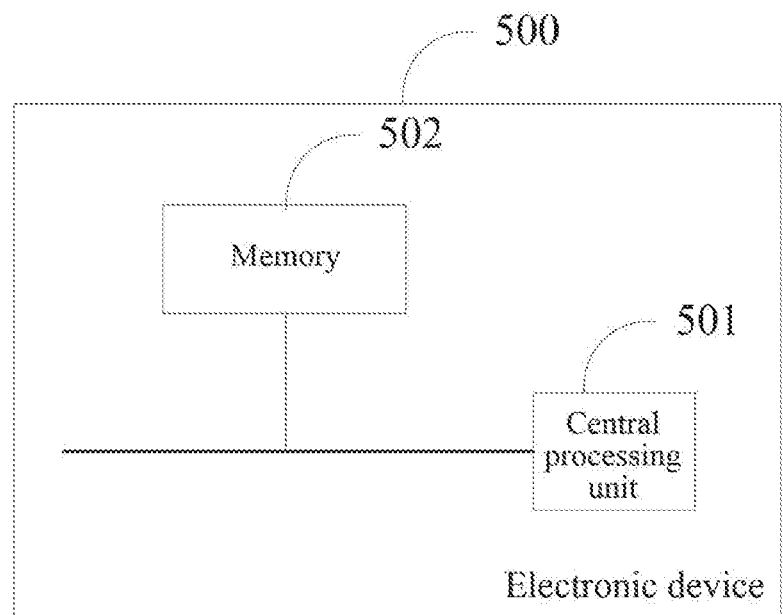
FIG. 9 is a schematic diagram of structure of an electronic device according to an implementation of the present disclosure.

An implementation of the application provides an electronic device. Referring to FIG. 9, the electronic device 500 may include a central processor 501 and a memory 502. The central processor 501 may be electrically connected to the memory 502.

The central processor 501 may be a control center of the electronic device 500, which connects at least one part of the entire electronic device using various interfaces and lines, performs various functions of the electronic device 500 and processes data by running or loading computer programs stored in the memory 502 and invoking data stored in the memory 502.

The memory 502 may be used to store computer programs and modules, and the central processor 501 executes various functional applications and data processing by running the computer programs and modules stored in the memory 502. The memory 502 may mainly include a program storage area and a data storage area, wherein the program storage area may store an operating system, a computer program required for at least one function (such as a sound playing function, an image playing function, etc.), and the like. The data storage area may store data or the like created according to the use of the electronic device. In addition, the memory 502 may include high speed random access memory and may also include non-transitory memory, such as at least one disk memory device, flash memory device, or other volatile solid state memory device. Accordingly, the memory 502 may also include a memory controller to provide access to the memory 502 by the central processor 501.

In an exemplary implementation, the electronic device 500 may further include a face recognition module, which may be implemented in hardware or software. And the face recognition module may be configured to perform a face recognition operation on an input image and output a face information set.

In an implementation of the present disclosure, the central processor 501 in the electronic device 500 performs the image processing method in any of the above implementations by running the computer program stored in the memory 502, for example, firstly acquiring a first face information set output by face recognition operation; acquiring the recognition duration of the face recognition operation; determining a preview image at a time point earlier than the time point when the first face information set is output by the recognition duration; and binding the first face information set with the determined preview image.

In an exemplary implementation, the electronic device 500 may further include a face recognition module. Acquiring the first face information set output by the face recognition operation may include acquiring the first face information set output by the face recognition module completing the face recognition operation. Acquiring the recognition duration of the face recognition operation may include acquiring the recognition duration for the face recognition module to complete the face recognition operation.

In an exemplary implementation, the electronic device 500 may further include an image signal processor. The central processor 501, when executing the computer program, may further perform a step of: acquiring an image of the first category and an image of the second category output by the image signal processor and having same image content; wherein the face recognition operation is performed on the image of the second category; and the image of the first category is stored as a preview image into a preconfigured image buffer queue. For example, the image signal processor may include an image processing circuit 507 in FIG. 11.

Figure 10:
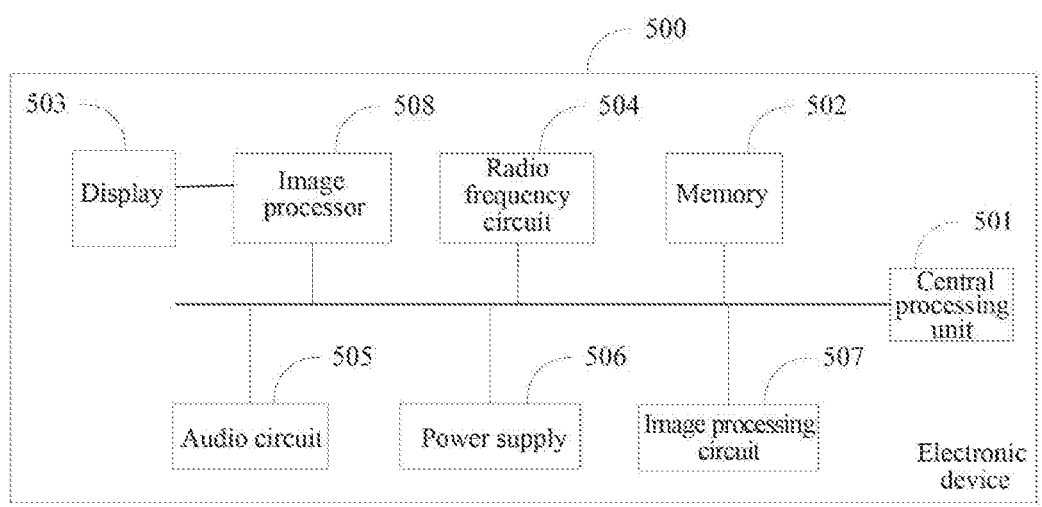
FIG. 10 is another schematic diagram of structure of an electronic device according to an implementation of the present disclosure.

Referring to FIG. 10, in some implementations, the electronic device 500 may further include a display 503, a radio frequency circuit 504, an audio circuit 505, a power supply 506, an image processing circuit 507, and an image processor 508. The display 503, radio frequency circuit 504, audio circuit 505 and power supply 506 are respectively electrically connected to the central processor 501.

The display 503 may be used to display information input by the user or provide information and various graphical user interfaces to the user. And the various graphical user interfaces are composed of graphics, text, icons, video, and any combination thereof. The display 503 may include a display panel, and in some implementations, the display panel may be configured in the form of a liquid crystal display (LCD), or an organic light-emitting diode (OLED), or the like.

The radio frequency circuit 504 may be used to transmit and receive radio frequency signals to establish wireless communication with network devices or other electronic devices, and transmit and receive signals with network devices or other electronic devices.

The audio circuit 505 may be used to provide an audio interface between the user and the electronic device through speakers and microphones.

The power supply 506 may be used to power one or more components of the electronic device 500. In some implementations, the power supply 506 may be logically connected to the central processor 501 through a power management system, thereby realizing functions such as managing charging, discharging, and power consumption management through the power management system.

The image processing circuit 507 may be implemented by using hardware and/or software components, and may include various processing units defining an image signal processing (ISP) pipeline. Referring to FIG. 11, in an exemplary implementation, the image processing circuit 507 includes an ISP processor 5071 and a control logic device 5072. The image data captured by a camera 5073 is firstly processed by the ISP processor 5071. The ISP processor 5071 analyzes the image data to capture image statistics that can be used to determine one or more control parameters of the camera 5073. The camera 5073 may include a camera with one or more lenses 50731 and an image sensor 50732. The image sensor 50732 may include an array of color filters (e.g., Bayer filters), and the image sensor 50732 may acquire light intensity and wavelength information captured with each imaging pixel of the image sensor 50732, and provide a set of original image data that may be processed by the ISP processor 5071. The sensor 5074 (e.g., gyroscope) may provide the collected image processing parameters (e.g., anti-shake parameters) to the ISP processor 5071 based on the interface type of the sensor 5074. The sensor 5074 interface may utilize a standard mobile imaging architecture (SMIA) interface, other serial or parallel camera interfaces, or a combination of the above interfaces.

In addition, the image sensor 50732 may also send the original image data to the sensor 5074, and the sensor may provide the original image data to the ISP processor 5071 based on the interface type of the sensor 5074, or the sensor 5074 may store the original image data in the image memory 5075.

The ISP processor 5071 processes the original image data in various formats, pixel by pixel. For example, each image pixel may have a bit depth of 8, 10, 12, or 14 bits, and the ISP processor 5071 may perform one or more image processing operations on the original image data to capture statistical information about the image data. The image processing operation may be performed according to the same or different bit depth accuracy.

The ISP processor 5071 may also receive image data from the image memory 5075. For example, the sensor 5074 sends the original image data to the image memory 5075 through the interface, the original image data in the image memory 5057 is provided to the ISP processor 5071 for processing. The image memory 5075 may be a part of a memory device, a storage device, or a separate dedicated memory within an electronic device, and may include direct memory access (DMA) features.

When receiving original image data from an interface of the image sensor 50732 or from an interface of the sensor 5074 or from image memory 5075, the ISP processor 5071 may perform one or more image processing operations, such as time domain filtering. The processed image data may be sent to the image memory 5075 for further processing before being displayed. The ISP processor 5071 receives the data to be processed from the image memory 5075 and performs image processing in the original domain, and RGB, YCbCr color spaces on the data to be processed. The image data processed by ISP processor 5071 may be output to the display 503 for viewing by the user and/or further processed by a graphics engine or the image processor 508. In addition, the output of ISP processor 5071 may also be sent to the image memory 5075, and the display 503 may read image data from the image memory 5075. In one exemplary implementation, the image memory 5075 may be configured to implement one or more frame buffers. In addition, the output of the ISP processor 5071 may be sent to encoder/decoder 5076 for encoding/decoding the image data. The encoded image data may be saved, and decompressed before being displayed on the display 503. The encoder/decoder 5076 may be implemented by a central processing unit (CPU) or a graphics processing unit (GPU) or a coprocessor.

The statistical data determined by the ISP processor 5071 may be sent to the control logic device 5072. For example, the statistical data may include statistical information of the image sensor 50732 such as auto exposure, auto white balance, auto focus, flicker detection, black level compensation, lens shadow correction, etc. The control logic device 5072 may include a processor and/or microcontroller that executes one or more routines (e.g., firmware) that may determine control parameters of the camera 5073 and ISP processor 5071 based on the received statistical data. For example, the control parameters of the camera 5073 may include control parameters of the sensor 5074 (e.g., gain, integration time point of exposure control, anti-shake parameters, etc.), flash control parameters of the camera, control parameters of the lens 50731 (e.g., focal length for focusing or zooming), or combinations of these parameters. The ISP control parameters may include gain levels and color correction matrices for automatic white balance and color adjustment (e.g., during RGB processing), as well as shadow correction parameters of the lens 50731, etc.

The image processor 508 may convert and drive display data to be displayed by the electronic device, and provide a line scanning signal to the display 503 to control the correct display of the display 503.

An implementation of the present disclosure provides a storage medium storing a computer program executable by a computer to perform the image processing method in any of the above implementations, for example, acquiring a first face information set output by face recognition operation; acquiring a recognition duration of the face recognition operation; determining a preview image at a time point earlier than the time point when the first face information set is output by the recognition duration; and binding the first face information set with the determined preview image.

In implementations of the present disclosure, the storage medium may be a magnetic disk, an optical disk, a read-only memory (ROM), or random access memory (RAM), etc.

In the above implementations, the description of each implementation has its own emphasis, the parts not detailed in one implementation, can be referred to the related descriptions in other implementations.

It should be noted that, for the image processing method of the implementations of the present disclosure, a person of ordinary skill in the art can understand that all or part of the flow of implementing the image processing method of the implementations of the present disclosure can be completed by controlling relevant hardware through a computer program. The computer program can be stored in a computer-readable storage medium. For example, the computer program is stored in a memory of an electronic device, executed by at least one central processing unit within the electronic device, and during execution process, the flow of the image processing method may be included. The storage medium may be a magnetic disk, optical disk, read-only memory, random access memory, etc.

As for the image processing device in the implementations of the present disclosure, various functional modules may be integrated into one processing chip, or each module may exist physically alone, or two or more modules may be integrated into one module. The integrated modules can be implemented in the form of hardware or software functional modules. If the integrated module implemented in the form of the software function module is sold or used as an independent product, it may also be stored in a computer-readable storage medium, such as a read-only memory, magnetic disk or optical disk, etc.

The image processing method, electronic device and storage medium provided by the implementations of the application are described above in details. In the application, specific examples are used to explain the principle and implementation of the application, the above description of the implementations is only used to help understanding the method and core ideas of the application. And those skilled in the art, will change the specific implementation and application range according to the concepts of the application. In conclusion, the contents of the specification should not be construed as limitations on the application.

What is claimed is:

1. A method for image processing, comprising:
    acquiring a first face information set output by face recognition operation;
    acquiring a recognition duration of the face recognition operation;
    determining a preview image at a time point earlier than an output time point by the recognition duration, the output time point being a time point when first face information set is output; and
    binding the first face information set with the determined preview image.

2. The method of claim 1, wherein acquiring the first face information set output by the face recognition operation comprises:
    acquiring the first face information set output by a face recognition module completing the face recognition operation; and
    wherein acquiring the recognition duration of the face recognition operation comprises:
    acquiring the recognition duration for the face recognition module to complete the face recognition operation.

3. The method of claim 1, further comprising:
    after acquiring the first face information set, binding the first face information set with a preview image at the output time point; and
    before binding the first face information set with the determined preview image, releasing a binding relationship between the first face information set and the preview image at the output time point.

4. The method of claim 1, further comprising:
    acquiring sequence information of face information in a second face information set output by a previous face recognition operation; and
    adjusting a sequence of face information in the first face information set according to the acquired sequence information.

5. The method of claim 1, further comprising:
    adjusting a sequence of face information in the first face information set according to a predetermined sequence rule for face information.

6. The method of claim 1, further comprising:
    acquiring an image of a first category and an image of a second category having same image content, wherein the face recognition operation is performed on the image of the second category, and the image of the first category is stored in a preconfigured image buffer queue as a preview image.

7. The method of claim 6, wherein a resolution of the image of the first category is greater than a resolution of the image of the second category.

8. The method of claim 6, wherein determining the preview image at the time point earlier than the output time point by the recognition duration comprises:
    determining an image of a first category of which a time point when the image of the first category is stored in the preconfigured image buffer queue is earlier than the output time point by the recognition duration; and
    the determined image of the first category being the determined preview image.

9. The method of claim 6, wherein after binding the first face information set with the determined preview image, the method further comprises:
    acquiring frame rate information of a camera when receiving an image shooting request;
    determining a target number corresponding to the frame rate information, and extracting images of the first category of the target number from the preconfigured image buffer queue to obtain a set of the images of the first category;
    determining an image of the first category to be processed from a set of images of the first category according to face information sets bound with the images of the first category in the set of the images of the first category, wherein the image of the first category to be processed comprises at least one face image meeting a predetermined condition; and performing predetermined processing on the image of the first category to be processed according to other images of the first category in the set of the images of the first category, wherein the image of the first category on which the predetermined processing is completed is a result image in response to the image shooting request.

10. The method of claim 9, wherein performing the predetermined processing on the image of the first category to be processed according to other images of the first category in the set of the images of the first category comprises:
 determining a face image to be replaced, wherein the face image to be replaced does not meet the predetermined condition in the image of the first category to be processed according to a face information set bound with the image of the first category to be processed;
 determining a target face image, wherein the target face image meets the predetermined condition from the other images of the first category in the set of the images of the first category, wherein the target face image and the face image to be replaced belong to a same person; and
 replacing the face image to be replaced with the target face image.

11. The method of claim 9, further comprising:
 performing noise reduction processing on the image of the first category on which the predetermined processing is completed.

12. The method of claim 11, wherein performing the noise reduction processing on the image of the first category on which the predetermined processing is completed comprises:
 performing the noise reduction processing on the image of the first category by applying multi-frame noise reduction.

13. An electronic device, comprising a processor and a memory storing a computer program executable by the processor to perform:
 acquiring a first face information set output by face recognition operation;
 acquiring a recognition duration of the face recognition operation;
 determining a preview image at a time point earlier than an output time point by the recognition duration, the output time point being a time point when the first face information set is output; and
 binding the first face information set with the determined preview image.

14. The electronic device of claim 13, further comprising a face recognition module, wherein acquiring the first face information set output by the face recognition operation comprises:
 acquiring the first face information set output by the face recognition module completing the face recognition operation,
 wherein acquiring the recognition duration of the face recognition operation comprises:
  acquiring the recognition duration for the face recognition module to complete the face recognition operation.

15. The electronic device of claim 13, wherein the processor, when executing the computer program, further performs:
 after acquiring the first face information set, binding the first face information set with a preview image at the output time point; and
 before binding the first face information set with the determined preview image, releasing a binding relationship between the first face information set and the preview image at the output time point.

16. The electronic device of claim 13, wherein the processor, when executing the computer program, further performs:
 acquiring sequence information of face information in a second face information set output by a previous face recognition operation; and
 adjusting a sequence of face information in the first face information set according to the acquired sequence information.

17. The electronic device of claim 14, further comprising an image signal processor, wherein the processor, when executing the computer program, further performs:
 acquiring an image of a first category and an image of a second category output by the image signal processor and having same image content, wherein the face recognition operation is performed on the image of the second category, and the image of the first category is stored into a preconfigured image buffer queue as a preview image.

18. The electronic device of claim 17, wherein a resolution of the image of the first category is greater than a resolution of the image of the second category.

19. The electronic device of claim 17, wherein determining the preview image at the time point earlier than the output time point by the recognition duration comprises:
 determining an image of a first category of which a time point when the image of the first category is stored in the preconfigured image buffer queue is earlier than the output time point by the recognition duration, wherein the determined image of the first category is the determined preview image.

20. A non-transitory computer-readable storage medium, comprising a computer program executable by a computer to:
 acquire a first face information set output by face recognition operation;
 acquire a recognition duration of the face recognition operation;
 determine a preview image at a time point earlier than an output time point by the recognition duration, the output time point being a time point when the first face information set is output; and
 bind the first face information set with the determined preview image.

* * * * *